INVENTORS
P. R. A. Briggs
A. B. Sims
BY
ATTORNEYS

April 27, 1965 P. R. A. BRIGGS ETAL 3,180,995
MEASUREMENT OF DIMENSION OF A MOVING OBJECT
Filed Jan. 16, 1962 3 Sheets-Sheet 3

INVENTORS
P. R. A. Briggs
R. B. Sims
BY
ATTORNEYS

United States Patent Office 3,180,995
Patented Apr. 27, 1965

3,180,995
MEASUREMENT OF DIMENSION OF A MOVING OBJECT
Peter Richard Ashworth Briggs and Raymond Bernard Sims, Sheffield, England, assignors to Davy and United Instruments Company Limited
Filed Jan. 16, 1962, Ser. No. 166,590
7 Claims. (Cl. 250—223)

This invention relates to the measurement of moving objects and is more particularly, but not exclusively, concerned with the measurement of the length of axially moving elongate objects such as lengths of steel.

The invention has particular application to the measurement of radiation emissive bodies while in motion and will be described with particular reference to such an application, but it should be understood that the invention is in no way limited to such an application and is applicable to the measurement of any body while in motion, whether the body is radiation emissive or not. For instance, bodies adapted to contrast with their background such as a black body on a white background or vice versa, may be measured by the system and apparatus to be described. The measurement of the body may be effected as it passes in front of a light source so as to interrupt the light impinging on a light-sensitive element or the inherent radiation emitted by a body may be employed for this purpose.

An object of the present invention is to provide an improved system and apparatus for taking the linear measurements of a body in an automatic manner and which is accomplished whilst the body is in motion.

A further object of the invention is to provide improved measuring apparatus which is simple in construction but operates efficiently and reliably.

In order that the present invention may be clearly understood in its various aspects and forms, the same will now be described, by way of example, with reference to the accompanying drawings, in which.

Figure 7:
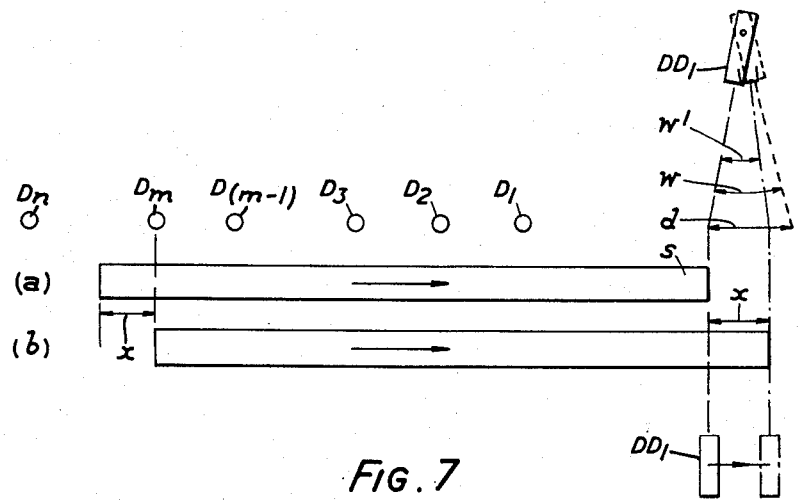
Figure 8:
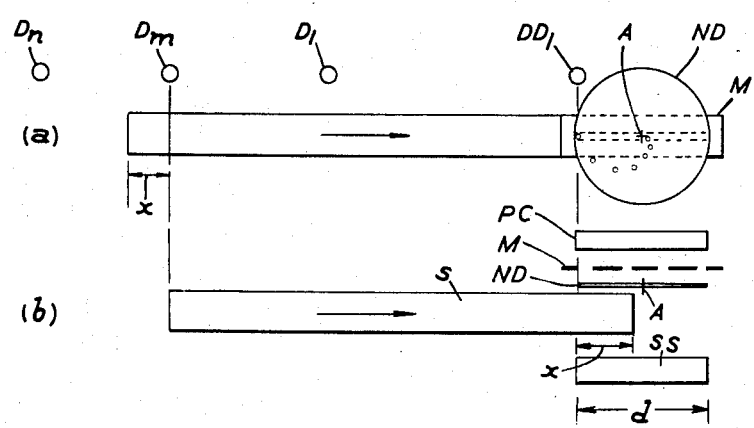

FIGURES 7(a) and (b) illustrate two embodiments of the invention in yet another form; and FIGURE 8 illustrates one embodiment of the invention in a still further form.

Figure 1:
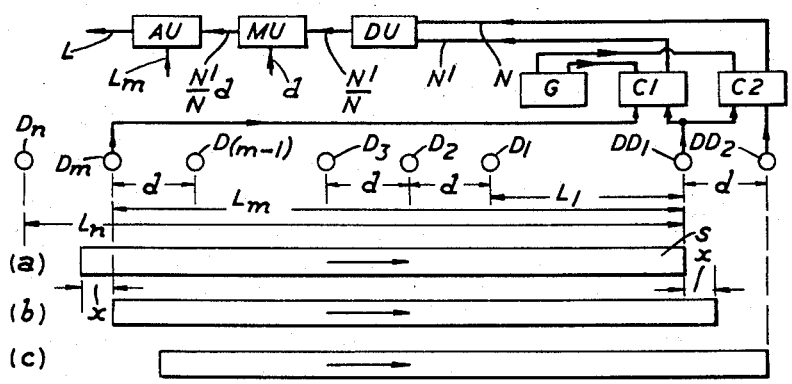
FIGURE 1 illustrates one embodiment of the invention in a first form.

The embodiment of FIGURE 1 comprises a line of first detecting devices $D_1$, $D_2$, $D_3$ ... $D_m$ ... $D_n$ and two datum detecting devices $DD_1$ and $DD_2$ disposed along the path of a moving elongate object S, the spacing between $DD_1$ and successive devices $D_1$ to $D_n$ being $L_1$ to $L_n$, respectively. The spacing between successive devices D is equal to that between $DD_1$ and $DD_2$ and is indicated as distance $d$.

In the operation of this arrangement the object S travels past the detecting devices in the direction indicated by the arrows, passing the devices in the order $D_n$ to $DD_2$. At the instant when the leading end of the object S is detected by datum device $DD_1$ a coarse measure of the length of the object is indicated by that device of the sequence $D_n$ to $D_1$ which is furthest from datum device $DD_1$ and is at that time actively detecting the object. In FIGURE 1, the particular device indicating the coarse measure of object S is shown as $D_m$ and the length so indicated is $L_m$.

Also at the instant when the leading end of the object S passes the datum device $DD_1$ an electrical signal controlled by the latter device initiates operation of two digital counters C1 and C2 in response to a digital pulse generator G operating at a predetermined, constant high frequency.

The position of the object S at which the latter coarse-measure indication and counter initiations occur is shown in FIGURE 1 and denoted as position (a). It will be seen from this position that an increment $x$ is to be added to the coarse measure $L_m$ to obtain a more accurate measurement of the length of the object S.

The object S continues to travel in the direction indicated, and at the position indicated as position (b) its trailing end passes detecting device $D_m$ and the electrical signal controlled thereby terminates the operation of counter C1 to record a count $N'$. The object S continues its motion and in position (c) its leading end passes the datum detecting device $DD_2$, whereat the electrical signal controlled thereby terminates operation of the other counter C2 to record a count $N$.

It will be seen from the positions of the object S in FIGURE 1 that, assuming the speed of movement thereof is constant when its leading end is passing between devices $DD_1$ and $DD_2$, $$\frac{N'}{N}=\frac{x}{d}$$

so that $$x=\left(\frac{N'}{N}\right)d$$

After termination of the counter operations, electrical signals representing counts $N'$ and $N$ are passed through a dividing unit DU, the output $N'/N$ of which is applied to a multiplier unit MU for multiplication by $d$ to generate a signal representing the increment $x$. This last signal is applied together with a further signal representing the coarse measure already obtained, namely $L_m$, to an adding unit AU to generate a final output signal representing the desired length of the object S which will be denoted as L and is seen to be derived as $$L=L_m+x=L_m+\left(\frac{N'}{N}\right)d$$

Figure 2:
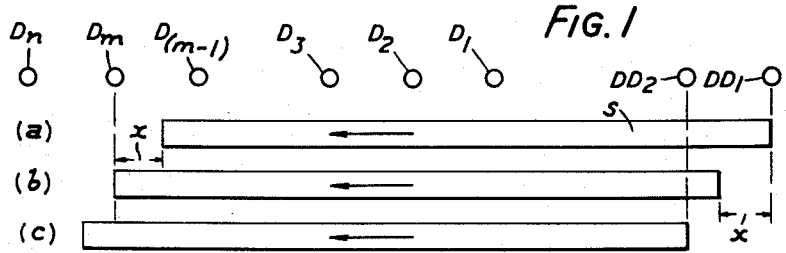
FIGURE 2 illustrates a modification of the arrangement of FIGURE 1.

FIGURE 2 shows the appropriate "controlling" positions of the object S for a modified operation of the system of FIGURE 1 when the object is travelling in the other direction along the same path. When the trailing end of the object passes the device $DD_1$ operation of counters C1, C2 is initiated, when the leading end of the object passes device $D_m$ the operation of counter C1 is terminated, and when the trailing end of the object passes device $DD_2$ the operation of the other counter C2 is terminated. It will be seen that the positions of devices $DD_1$ and $DD_2$ are interchanged, and with the same assumption regarding the rate of movement of the object S the desired length L is given by $$L=L_{m-1}+\frac{N-N'}{N}\cdot d$$

$$=L_{m-1}+d-\left(\frac{N'}{N}\right)d$$

$$=L_m-\left(\frac{N'}{N}\right)d$$

It will be seen that, to obtain this result, the coarse measure is indicated by the device D which is passed during the counting operations, or rather that device $D_m$ which terminates the operation of counter C1. Also it will be noted that a subtractor unit is employed in place of the adding unit AU of FIGURE 1 above.

Figure 3:
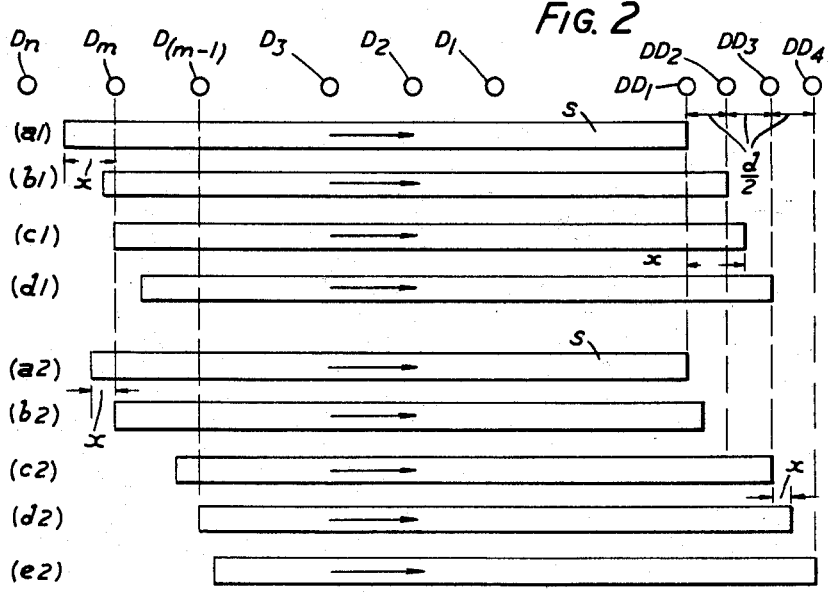
FIGURE 3 illustrates one embodiment of the invention in another form.

If in particular circumstances, it is undesirable to assume substantially constant speed for travel of an object to be measured over a distance $d$, instead of merely reducing $d$ and so increasing the number of detecting devices D necessary for measurement over the same range, an alternative system may be adopted as shown by example in FIGURE 3 by making use of two further datum detecting devices $DD_3$ and $DD_4$. In this case the spacings between successive devices $DD_1$ to $DD_4$ are each equal to $$\frac{d}{2}$$

and it will be seen that substantially constant speed need only be assumed over a distance $$\frac{d}{2}$$

A coarse measure indication, shown as $L_m$, is determined as before by device $D_m$, when the leading end of the object passes datum device $DD_1$. Thereafter the operation differs accordingly as the additional increment of length $x$ is greater than or less than $$\frac{d}{2}$$

If $x$ is greater than $$\frac{d}{2}$$

the leading end of the object passes datum device $DD_2$ before the trailing end passes device $D_m$, as shown by position ($b1$). In this event, operation of two counters C1 and C2 is initiated when the leading end of the object passes datum device $DD_2$, operation of counter C1 is terminated to record a count $N'$ when the trailing end passes device $D_m$, and operation of counter C2 is terminated to record a count $N$ when the leading end passes datum device $DD_3$. These three positions of the object are indicated at ($b1$), ($c1$) and ($d1$).

It will be seen that in the latter case a measure of the desired length L can be determined on the assumption that $$\frac{N'}{N} = \frac{x - (d/2)}{d/2}$$

so that $$L = L_m + \frac{d}{2} + \left(\frac{N'}{N}\right)\frac{d}{2}$$

If, however, $x$ is less than $$\frac{d}{2}$$

the trailing end of the object passes device $D_m$ before the leading end passes datum device $DD_2$, as shown by position ($b2$). In this event operation of counters C1 and C2 is initiated when the leading end of the object passes datum device $DD_3$, operation of counter C1 is terminated to record a count $N'$ when the trailing end passes device $D_{m-1}$ and operation of counter C2 is terminated to record a count $N$ when the leading end passes datum device $DD_4$. These last three positions of the object are indicated at ($c2$), ($d2$) and ($e2$).

In this case a measure of length L is determined on the assumption that $$\frac{N'}{N} = \frac{x}{d/2}$$

whence $$L = L_m + \left(\frac{N'}{N}\right)\frac{d}{2}$$

Figure 4:
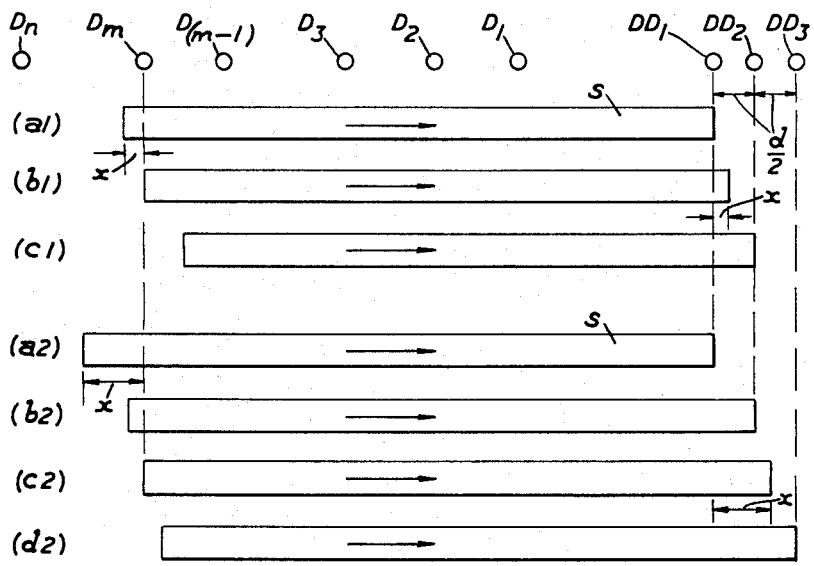
FIGURE 4 illustrates a modification of the arrangement of FIGURE 3.

In a modified form of the system of FIGURE 3, the coarse-measure indication is obtained as before, but datum device $DD_4$ is omitted as shown by FIGURE 4.

In the different operation of FIGURE 4, the operation of both counters C1 and C2 is initiated when the leading end of the object passes datum device $DD_1$. If $x$ is less than $$\frac{d}{2}$$

the next operative position is ($b1$), when the trailing end passes device $D_m$ and operation of counter C1 is terminated to record a count $N'$. Thereafter, at position ($c1$) operation of counter C2 is terminated to record a count $N$ when the leading end passes datum device $DD_2$. It will be realised that this operation is in fact that of FIGURE 1 and a measure of L is given by $$L = L_m + \left(\frac{N'}{N}\right)\frac{d}{2}$$

If, however, $x$ is greater than $$\frac{d}{2}$$

the leading end of the object passes datum device $DD_2$ before the trailing end passes device $D_m$. This position is indicated at ($b2$), and in this event operation of the counters is re-initiated from zero once more. Thereafter, operation of counter C1 is terminated to record a count $N'$ when the trailing end passes device $D_m$ in position ($c2$), and operation of counter C2 is subsequently terminated to record a count $N$ when the leading end passes datum device $DD_3$, at position ($d2$). In this case the basic assumption is that $$N' = \frac{x - (d/2)}{d/2}$$

whence $$L = L_m + \frac{d}{2} + \left(\frac{N'}{N}\right)\frac{d}{2}$$

Figure 5:
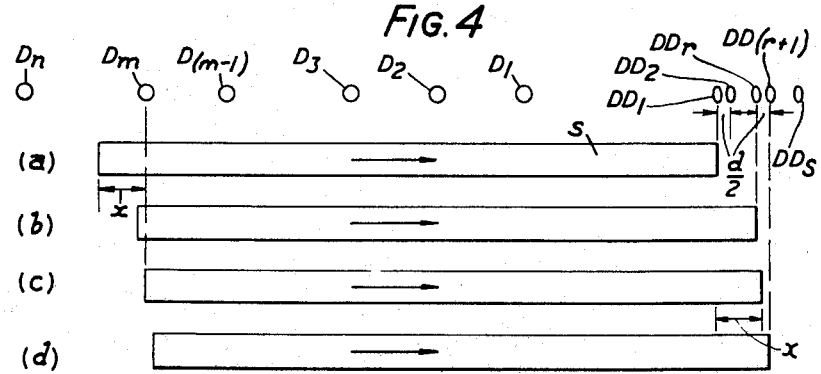
FIGURE 5 illustrates a generalised form of the modification of FIGURE 4.

FIGURE 5 shows a generalisation of the arrangement of the system of FIGURE 4, in which ($s+1$) datum devices are employed, successively spaced apart by $$\frac{d}{s}$$

If the increment $x$ is less than $$\frac{d}{s}$$

then the operation is as before, the counts $N'$ and $N$ being determined by control of devices $DD_1$, $D_m$ and $DD_2$.

If, however, the increment $x$ is greater than $$\frac{d}{s}$$

then the two counters are re-initiated from zero as the leading end passes successive datum devices until the trailing end next passes a device, again denoted as $D_m$. Operation of counter C1 is terminated to record a count $N'$ at this position ($c$), and operation of counter C2 is terminated to record the corresponding count $N$ when the leading end next passes a datum device, denoted as $DD_{r+1}$, in position ($d$).

The increment $x$ thus lies between $$r \cdot \frac{d}{s} \text{ and } (r+1)\frac{d}{s}$$

and on the assumption that $$N' = \frac{x - r(d/s)}{d/s}$$

the length L is determined as $$L = L_m + \frac{r \cdot d}{s} + \left(\frac{N'}{N}\right)\frac{d}{s}$$

It will be appreciated that appropriate modification can be made to the operations of FIGURES 3, 4 and 5 above, for the case where the object travels in the reverse direction to that indicated.

Figure 6:
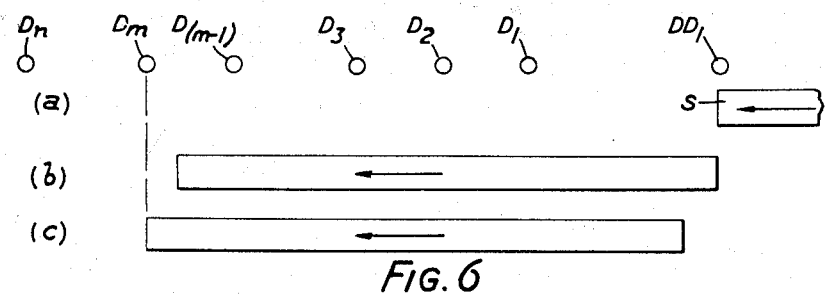
FIGURE 6 illustrates one embodiment of the invention in another form.

FIGURE 6 illustrates a further arrangement, in which individual indications of a coarse and fine vernier measure are not made. In this case, operation of the two counters C1 and C2 is initiated when the leading end of the object passes a single datum device $DD_1$, as shown in position (a). Thereafter the leading end passes a line of devices $D_1, D_2 \ldots D_{m-1}, D_m \ldots D_n$ successively spaced by distance $d$, as before. Operation of counter C1 is terminated to record a count N when the trailing end passes datum device $DD_1$, as shown in position (b) when the leading end of the object is between devices $D_{m-1}$ and $D_m$. Operation of counter C2 is terminated to record a count N when the leading end subsequently passes device $D_m$, as shown in position (c).

Assuming that the rate of movement of the object is constant for travel of the leading end between devices $D_{m-1}$ and $D_m$, we have $$\frac{N'}{N} = \frac{L}{L_m}$$

where $L_m$ denotes the distance between devices $DD_1$ and $D_m$, as defined above in relation to FIGURE 1.

Thus a measure of the length of the object S is determined by $$L = \left(\frac{N'}{N}\right) L_m$$

Although no reference has been made to the length-calculating units ancillary to the devices D and DD of the above systems of FIGURES 1 to 6, other than those of FIGURES 1 and 2, this is thought unnecessary since the functions and connections of these units are self-evident from the descriptions of operation. Also it is evident that some means is required to record and generate electrical signals representing the appropriate length $L_m$ and lengths $d$, $d/2$ and $d/s$ when required for computation of length L. These means may be of any suitable form.

The devices D and DD may be of any suitable form for the detection of an object which is or can be contrasted with its background as viewed by the devices in question. Thus the operative arrangements of devices D and DD may comprise photoelectric cells, photo-transistors or any other similar devices.

One application of the invention as mentioned earlier is to the measurement of lengths of steel such as, for example, slabs, blooms, plates, strips, sheets, bars, rounds, billets, rods and flats, and in such application the object will frequently have reflective or radiative properties which may be employed for the purpose of detection.

In any event, it will be seen that a detecting-device arrangement is readily provided such as to control an electrical signal having two forms, one form representing detection of the object opposite the device and the other form denoting absence of the device in a position opposite the device, for example. Thus, detection of a leading or trailing end of the object is indicated by an appropriate change of state and such a change of state is readily utilised to produce an individual control pulse for initiating or terminating a counting operation, say, by differentiation or other techniques.

Two embodiments of another form of the invention using a vernier unit comprising a high speed follower device are illustrated in FIGURES 7(a) and (b).

These embodiments include a line of detecting devices $D_1$ to $D_n$, successively spaced apart by equal distances $d$, and spaced from a datum detecting device $DD_1$ by distances $L_1$ to $L_n$, as before. However, in this case the datum device is embodied in a high-speed-follower device which tracks an end of the object S to be measured during a predetermined period, to obtain an indication of an incremental length $x$.

In FIGURE 7(a) the high-speed-follower device $DD_1$ is rotatable about a fixed pivot, spaced from the path of the object, to view successive points of that path in a fixed range $d$ during rotation from its datum position. The datum position is indicated in full outline at one limit of rotation, and the other limiting rotational position is indicated in broken outline.

A coarse indication of length L, as $L_m$, is given by device $D_m$, the furthest of the devices D from $DD_1$ to detect passage of the trailing end of the object when the leading end is detected by device $DD_1$ in its datum rotational position, as shown in position (a) of FIGURE 7(a). As the object S continues to move, the device $DD_1$ tracks the leading end of the object until the trailing end passes the next detecting device, $D_m$. At the latter instant, the rotation of device $DD_1$ is terminated and it will be seen that, if $w'$ is the angular movement of $DD_1$ from its datum position on termination of rotation, compared to the full range of angular movement $w$, then assuming a constant rate of movement of the object during rotation of $DD_1$:

$$\frac{w'}{w} = \frac{x}{d}$$

whence $$L = L_m + \frac{w'}{w} \cdot d$$

Tracking of the leading end of the object by device $DD_1$ may be effected in any suitable manner, such as by employing a servo system, initiated by initial detection of the trailing end, to rotate the device to maintain the associated electrical signal controlled thereby at a predetermined state intermediate those denoting detection and non-detection of the object, for example.

In an alternative form, an electrical signal (such as a voltage representation) which is directly proportional to the increment $x$, may be obtained by use of a suitable form of tangential resolver, or rotary transformer, or other means which produces an electrical signal directly proportional to angular rotation.

It will be appreciated that where the arrangement of FIGURE 7(a) is to be used for measurement of objects having significantly different dimensions in the viewing direction of device $DD_1$, error which can arise as a result of this will be reduced as the separation of the device $DD_1$ from the object path is increased. This increase of separation decreases the angular rotation to cover the full detecting range $d$ to make the different viewing paths more nearly normal to the object path. At the same time, since the full range of rotation is decreased, the actual rate of rotation of device $DD_1$ necessary to track an object is reduced, for any given object speed. However, the sensitivity of tracking must be appropriately increased to avoid a counteracting error being introduced.

In the other embodiment of this form of the invention, shown in FIGURE 7(b), the follower device $DD_1$ is movable from a datum position along a path parallel to that of the object to be tracked, over a distance $d$. In this way the above error difficulty does not arise, since the device $DD_1$ tracks the leading end of the object to maintain a view thereof normal to the object path.

One embodiment of another form of the invention using a vernier unit which includes means for scanning predetermined points spaced along a predetermined vernier range of the object path is illustrated in FIGURE 8.

Once again this embodiment comprises a line of devices $D_1$ to $D_n$ and a datum device $DD_1$, and a coarse indication of length L, denoted $L_m$, is obtained as above when the leading end passes datum device $DD_1$, as shown in position (a).

This embodiment makes use of a Nipkoff disc ND disposed in a horizontal plane above the object, which disc is associated with a strip-beam light-source SS below the path of the object, a photo-electric cell PC above the disc, and a slit-apertured mask M between the cell PC and the disc. The strip source and slit aperture of the mask are disposed parallel to the object path, and the disc has a plurality of apertures arranged in spiral form and so spaced that, when the disc rotates, equally spaced points along the object path are successively scanned through the slit aperture of the mask. Therefore, as the disc rotates, the photo-electric cell PC receives a number of pulses of light from the light source SS, this number being dependent upon the position of the leading end of the object, the speed of rotation of the disc, and the spacing of the equally spaced points along the object path.

The scanning range $d$ commences from the point of the object path viewed by datum device $DD_1$, and scanning, by rotation of the disc, is initiated by $DD_1$ upon detection of the leading end of the object in position $(a)$. Scanning is terminated when the trailing end next passes a device D, namely $D_m$. The disc is in fact rotated at very high speed compared to the speed of the object S, and so makes a number of rotations, or cycles, during operation, and it will be seen that in successive cycles progressively fewer of the apertures in their operative scanning positions, pass light from SS, through the mask M, to the cell PC, due to the interception of the light from SS by the object.

During scanning, the light is passed to the cell PC in pulses and the cell thus generates, or can control, an electrical signal which is applied during successive scanning cycles to digital counters C1 and C2. The necessary counter input switching for this purpose is readily effected in response to the rotation of the disc ND in any suitable manner, and the two counters are reset to count from zero at the beginning of each respective input cycle.

It will be seen that on termination of counting, with the object in position $(b)$, one counter will record a full-cycle count, which is in fact the last such count before termination; and this count is a direct indication of $(d-x)$.

For simplicity in obtaining a measure of $x$, the counters, rather than add digits, may subtract digits from the sum of digits constituting a full non-intercepted cycle of scanning, that is, the sum of apertures, to produce a final full-cycle count directly proportional to $x$.

If the object itself emits radiation, such as a hot steel billet for example, clearly means such as the photo-electric cell PC may be directly responsive to such radiation to operate the counters, so that a light source SS need not be employed. In this case the counters preferably sum digits from zero, to give a final full-cycle count directly proportional to increment $x$.

Clearly, in the above embodiments of FIGURES 7 and 8, simple modification may be made for the case where the object travels in the reverse direction to that indicated, whereby the trailing end may be tracked or scanned, as the case may be.

Where it is required to measure lengths over a considerable range and an approximate measure of the length of objects is known beforehand, operation of a system in accordance with the invention may be made flexible to take account of a large range. In such a flexible system the apparatus comprises two units, one including the first detecting devices, and the other the datum detecting device or devices and/or other vernier means. One of these units may be fixed, and the other movable along the object path and adapted for precise location in a number of overlapping dispositions along that path; alternatively, both units may be made movable along the object path.

These arrangements may be employed with any of the above systems and may be considered as making one unit adjustable whereby the separation of the units can be selectively adjusted by the addition of a constant K to the minimum separation, which constant is any one of a number of predetermined lengths.

Alternatively, a number of vernier or fractional indicating units may be employed spaced at different distances from a common succession of first detecting devices or range cells to provide overlapping or separate ranges of measurement.

In a further modification of the above arrangements in which a plurality of fractional or vernier measuring units are employed in association with a common coarse or units measuring unit, at least partially common indicating means may be employed. Also, at least partially common indicating means may be employed in association with two or more sequences of detecting devices where it is not required to employ more than one sequence of such devices to measure an object at any time.

We claim:
1. A system for measuring the dimension of a moving object along its path of travel, said system comprising a first series of detecting devices equally spaced along said path of travel by a unit distance and a second series comprising a plurality of datum detecting devices spaced along said path of travel at one end of said first series, each of said datum detecting devices being spaced from the next by a uniform distance with two of said datum detecting devices being spaced from each other by said unit distance, said detecting devices being of a type which changes state when an edge of said object passes thereby, means for transmitting upon sequential change of state by one of said datum detecting devices and one of said first series of detecting devices a coarse measure signal representative of the distance between the devices which have changed state, and time-counting means connected to start two counts upon a change of state by one of said datum detecting devices, and to halt one of said counts when a detecting device of said first series next changes state and the other of said counts when another datum detecting device changes state, means for dividing the total of one of said counts by that of the other and multiplying the result by a factor representative of the distance between the datum detecting devices which have changed state to produce a signal representing the difference between said dimension and the distance represented by said coarse measure signal and means for totalling said coarse measure and incremental signals.

2. A system as claimed in claim 1 in which there are only two datum detecting devices, and said two datum detecting devices are positioned downstream of said path of travel from said first series of detecting devices, so that said counts are started when the leading edge of said object reaches the datum detecting device furthest upstream after passing said first series of detecting devices.

3. A system as claimed in claim 1 in which there are only two of said datum detecting devices, and said two datum detecting devices are positioned upstream of said path of travel from said first series of detecting devices, whereby said counts are started when the trailing edge of said object passes the datum device furthest upstream after its leading edge has passed one of said first series of detecting devices, and said incremental signal is subtracted from said coarse measure signal.

4. A system as claimed in claim 1 in which there are four datum detecting devices, each spaced from the next by a distance equal to half that between adjacent detecting devices of the first series.

5. A system as claimed in claim 1 in which there are $S+1$ datum detecting devices each spaced from the next by a distance $d/S$, where S is an integer and $d$ is the distance between adjacent detecting devices of said first series.

6. A system as claimed in claim 1 in which said second series comprises at least one intermediate datum detecting device positioned between two other datum detecting devices, said counting means being connected to both terminate and re-initiate said counts in response to a change of state by any such intermediate datum detecting device when said last mentioned change of state is the first to follow a change of state by the datum detecting device immediately preceding said intermediate device along said path of travel.

7. A system for measuring the dimension of a moving object along its path of travel, said system comprising a first series of detecting devices equally spaced along said path of travel by a unit distance and a second series comprising a plurality of datum detecting devices spaced along said path of travel at one end of said first series, each of said datum detecting devices being spaced from the next by a uniform distance with two of said datum detecting devices being spaced from each other by said unit distance, said detecting devices being of a type which changes state when an edge of said object passes thereby, means for transmitting upon sequential change of state by one of said datum detecting devices and one of said first series of detecting devices a coarse measure signal representative of the distance between the devices which have changed state, pulse generating means for generating electrical pulses at a constant high frequency, two pulse counting means connected to start a count of said pulses in response to a change in state by one of said datum detecting devices, one of said counting means being connected to be halted when any detecting device of said first series next changes state and the other counting means being connected to be halted when another datum detecting device changes state, means for dividing the count reached by one of said counting means by that reached by the other and for multiplying the result by a factor representative of distance between the datum detectors which have changed state to produce a signal representing the difference between said dimension and the distance represented by said coarse measure signal, and means for totalling said coarse measure and incremental signals.

References Cited by the Examiner
UNITED STATES PATENTS

| | | | |
|---|---|---|---|
| 2,415,168 | 2/47 | Gieseke | 250—209 X |
| 2,989,690 | 6/61 | Cook | 250—219 X |
| 2,999,944 | 9/61 | Laycak | 250—219 |
| 3,009,103 | 11/61 | Heaney et al. | 324—68 |
| 3,061,732 | 10/62 | Milnes | 250—219 |
| 3,066,226 | 11/62 | Lindstrom | 250—222 |

RALPH G. NILSON, *Primary Examiner.*

WALTER STOLWEIN, *Examiner.*